A. WOOLNER.
Treating Grain for Distillation.
No. 154,312. Patented Aug. 18, 1874.
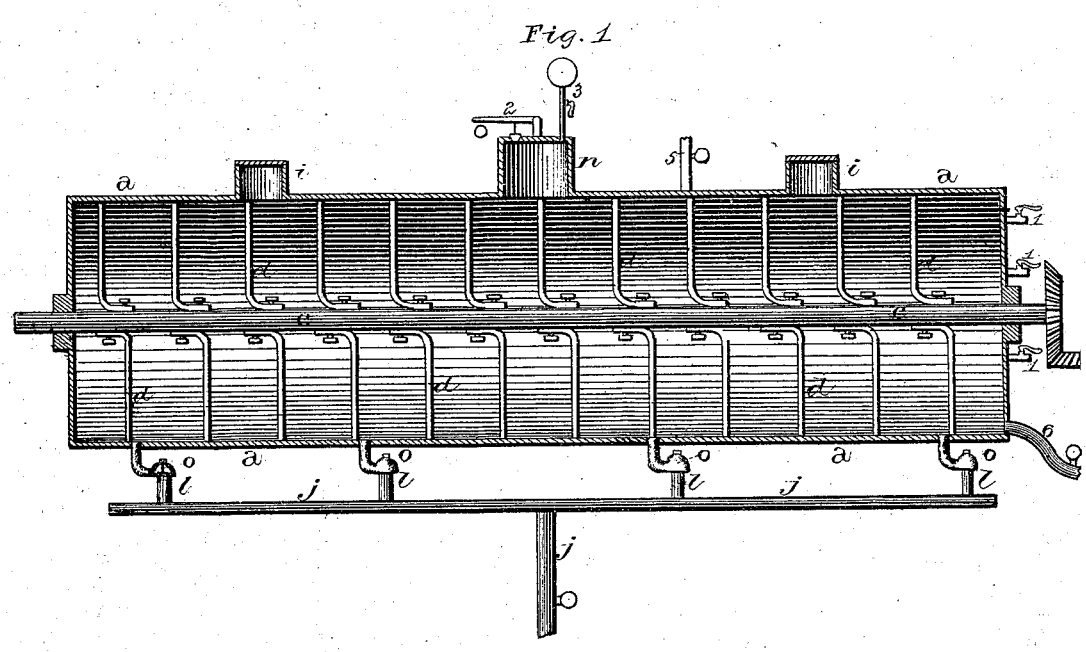
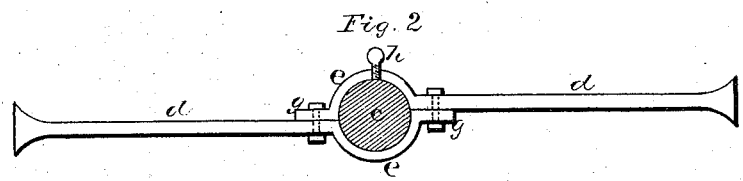
WITNESSES.
INVENTOR.

UNITED STATES PATENT OFFICE.

ADOLPH WOOLNER, OF LOUISVILLE, KENTUCKY.

IMPROVEMENT IN TREATING GRAIN FOR DISTILLATION.

Specification forming part of Letters Patent No. 154,312, dated August 18, 1874; application filed August 8, 1874.

*To all whom it may concern:*

Be it known that I, ADOLPH WOOLNER, of Louisville, in the county of Jefferson and State of Kentucky, have invented certain new and useful Improvements in Treating Grain for Distillation; and I do hereby declare the following to be a full, clear, and exact description of the invention, such as will enable others skilled in the art to which it pertains to make and use it, reference being had to the accompanying drawings, which form part of this specification.

My invention relates to an improvement in treating grain for distillation; and it consists in the arrangement and combination of devices, which will be more fully described hereafter, whereby the process is greatly quickened and cheapened, and a better result in the quantity and quality of the spirits produced is obtained.

Figure 1 is a longitudinal section of my invention. Fig. 2 is a cross-section of the shaft, showing the manner of attaching the arms.

$a$ represents an ordinary boiler made of sheet iron or other suitable material, through which extends the revolving shaft $c$, to which are attached a number of arms, $d$, for the purpose of keeping the grain thoroughly stirred up during the boiling operation. These arms have their outer ends widened or flattened, as shown in Fig. 2, and upon their inner ends are formed the semicircles $e$, which pass around the sides of the shaft $c$, and the ears $g$, through which are passed the bolts for securing the two arms together. These inner ends are so bent or shaped that the two arms are not placed on a line with each other, but are fastened to the shaft so that one of them will be from an inch to an inch and a half farther along the shaft than the other, as shown in Fig. 1. In this manner the arms are more evenly divided over the whole length of the boiler, and a fewer number is required. By means of the set-screw $h$ these arms can be adjusted back and forth along the shaft, so as to be moved nearer together or farther apart, as may be desired. Near each end of the boiler is placed a man-hole, $i$, through which the meal to be boiled is poured. Heretofore but a single man-hole has been used for this purpose, but when the meal is thus poured in one place, it takes a long time for the revolving rake to evenly distribute it over the whole length of the boiler, besides bringing a severe strain upon the rake at this point. When, however, it is divided into two portions and poured in at different points, it is quickly and easily distributed, and every part is boiled alike. The steam by which the meal is boiled is introduced from the pipes $j$, which extend along under the boiler, and from which, about every four feet, there projects up into the boiler a short pipe, $l$, in which is placed an ordinary check-valve, $o$, which allows the steam to pass freely into the boiler, but nothing to run out. By introducing the steam into the boiler at different points, the meal is evenly boiled throughout, and an even temperature kept in all parts of the boiler. Heretofore the steam has been introduced into the boiler through a long perforated pipe which extends along in the bottom, but this pipe prevents the arms from reaching down to the bottom, and as the meal settles down around it there is no way to get it loose. These pipes $l$ entirely overcome this objection. Upon the top of the boiler is placed a dome, $n$, about eighteen inches high, upon the top of which is placed the safety-valve 2 and steam-gage 3. When this valve and gage are placed upon the top of the boiler in the usual manner, the steam blows the meal up against them, and soon clogs them up so as to be inoperative. By placing them up upon the top of this dome, they are placed beyond the reach of the meal, and this trouble avoided. The boiler is provided with suitable try-cocks, 1, and all of the pipes with valves, whereby the flow through them is regulated at will.

The operation is as follows: The boiler is first filled up to a suitable point with hot water, through the pipe 5, and then the meal is poured in through the two man-holes, and the rake set in motion. The steam is turned on until a pressure of about fifty pounds to the square inch is reached, which raises the heat in the boiler to about 250°. After the meal has been sufficiently boiled, it is let off into the mash-tub through the discharge-pipe 6. When this tub is placed above the level of the bottom of the boiler, a steam-pipe may be introduced into the boiler for blowing out the mash to raise it to a higher level. By subjecting the grain to such a high degree of heat in a closed boiler, all the oil in the corn is separated from the meal, and as it rises in the fermenting-tub to the top it can be skimmed off and saved, while its removal greatly improves the quality of the spirits produced.

Having thus described my invention, I claim—

1. The arms $d$, provided with the concaves $e$, and ears $g$, whereby they are secured to the shaft $c$, substantially as set forth.

2. The arms $d$ placed in such relation to each other that one is farther along the shaft than the other, they being clamped together in pairs, and made adjustable back and forth on the shaft, by means of a set-screw, $h$, substantially as shown.

3. The dome $n$ placed upon the top of the boiler for the protection of the safety-valve and steam-gage, substantially as described.

4. The combination of the boiler $a$, and steam-pipes $j$ $l$, the pipes $l$ being introduced into the boiler at its bottom, and provided with check-valves $o$, substantially as specified.

In testimony that I claim the foregoing I have hereunto set my hand this 8th day of August, 1874.

ADOLPH WOOLNER.

Witnesses:
   F. A. LEHMANN,
   J. H. WILKINSON.